US008330793B2

(12) United States Patent
Robinson et al.

(10) Patent No.: US 8,330,793 B2
(45) Date of Patent: Dec. 11, 2012

(54) VIDEO CONFERENCE

(75) Inventors: Ian N. Robinson, Pebble Beach, CA (US); William Culbertson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 630 days.

(21) Appl. No.: 12/576,408

(22) Filed: Oct. 9, 2009

(65) Prior Publication Data

US 2011/0085017 A1    Apr. 14, 2011

(51) Int. Cl.
*H04N 7/14* (2006.01)
(52) U.S. Cl. ............... 348/14.08; 348/14.16; 348/14.12
(58) Field of Classification Search .... 348/14.01–14.16; 370/260–261; 715/753, 755, 751; 382/154
See application file for complete search history.

(56) References Cited

U.S. PATENT DOCUMENTS

| | | | | |
|---|---|---|---|---|
| 5,933,151 A | * | 8/1999 | Jayant et al. | 345/473 |
| 6,606,111 B1 | * | 8/2003 | Kondo et al. | 348/14.01 |
| 6,795,106 B1 | * | 9/2004 | Cooper | 348/14.08 |
| 2002/0106120 A1 | * | 8/2002 | Brandenburg et al. | 382/154 |
| 2007/0188596 A1 | * | 8/2007 | Kenoyer | 348/14.08 |
| 2008/0291265 A1 | * | 11/2008 | Wagner et al. | 348/14.16 |
| 2009/0113307 A1 | * | 4/2009 | MacKenzie | 715/732 |
| 2010/0315482 A1 | * | 12/2010 | Rosenfeld et al. | 348/14.08 |

OTHER PUBLICATIONS

Jenkin, et al. "eyeView: Focus+Context Views for Large Group Video Conferences." Apr. 2005. Human Media Lab Queen's University, Kingston, Ontario, Canada.

* cited by examiner

*Primary Examiner* — Melur Ramakrishnaiah
(74) *Attorney, Agent, or Firm* — Chun-Liang Kuo

(57) ABSTRACT

A method for rendering a video conference including identifying a location of a focus region and a size of the focus region by tracking a head position of a participant viewing the video conference and rendering the video conference to increase an amount of display resources for one or more participants included in the focus region and decrease the amount of display resources for one or more of the participants not included in the focus region.

16 Claims, 7 Drawing Sheets

VIDEO CONFERENCE

BACKGROUND

When viewing participants in a video conference, a participant often utilizes one or more devices to manually adjust camera viewing angles and camera zoom levels of himself/herself and for other participants of the video conference in order to capture one or more participants to view for the video conference. Additionally, the participant often physically manipulates his/her environment or other participants' environment by moving video conference devices around. Once the participant is satisfied with the manipulations, the participant views video streams of the participants as the video conference.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

Figure 1:
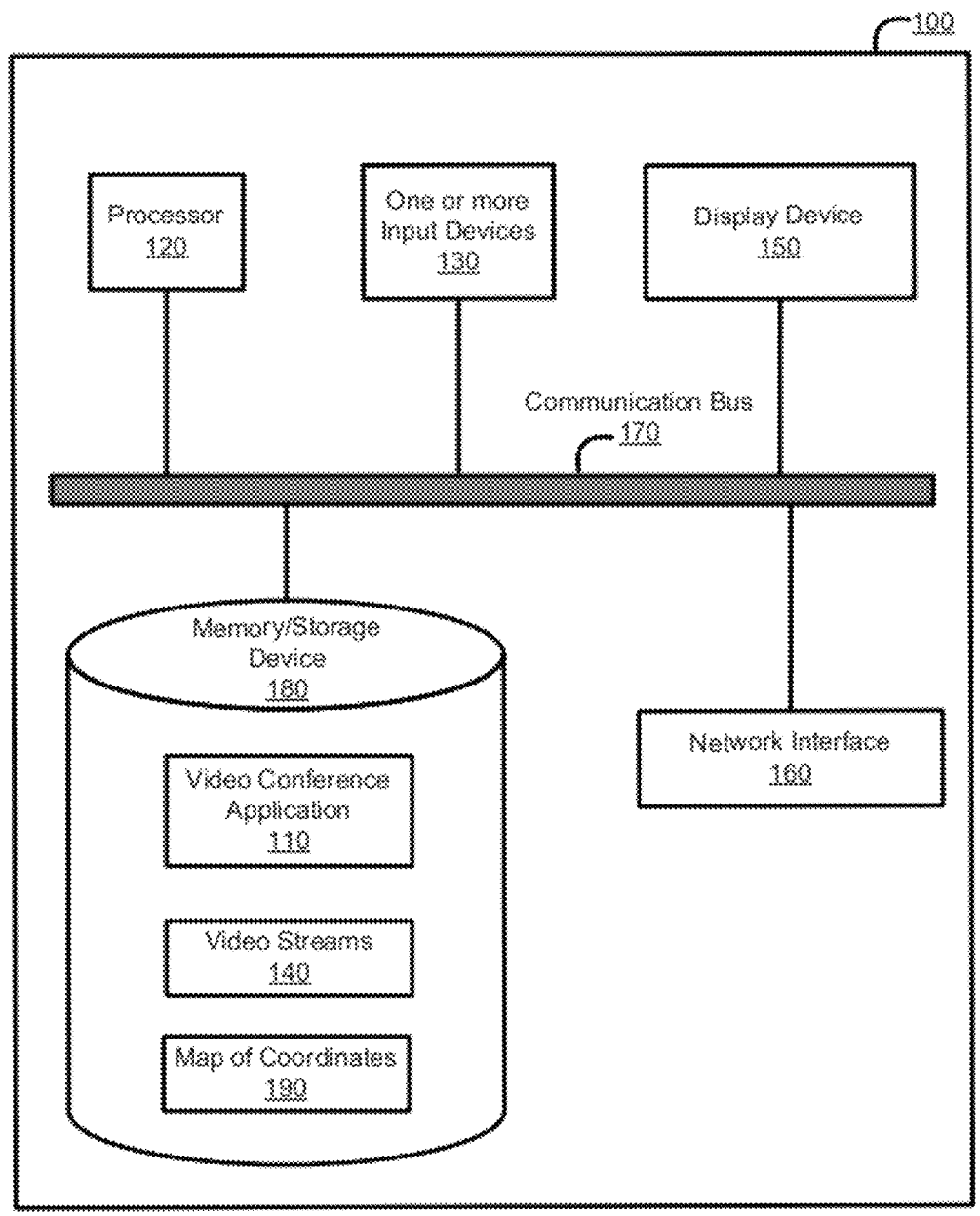
FIG. 1 illustrates a block diagram of a machine with one or more input devices and a display device according to an embodiment of the invention.

FIG. 1 illustrates a block diagram of a machine 100 with one or more input devices 130 and a display device 150 according to an embodiment of the invention. In one embodiment, the machine 100 is a desktop, laptop/notebook, netbook, and/or any other computing device. In another embodiment, the machine 100 is a video conference center and/or the machine 100 is included as part of the video conference center.

As illustrated in FIG. 1, the machine 100 includes a processor 120, a network interface 160, a display device 150, one or more input devices 130, a memory/storage device 180, and a communication bus 170 for the machine 100 and/or one or more components of the machine 100 to communicate with one another. Additionally, as illustrated in FIG. 1, the memory/storage device 180 stores a video conference application 110, video streams 140 of participants participating in a video conference, and a map of coordinates 190. In other embodiments, the machine 100 includes additional components and/or is coupled to additional components in addition to and/or in lieu of those noted above and illustrated in FIG. 1.

As noted above and as illustrated in FIG. 1, the machine 100 includes a processor 120 coupled to the machine 100. The processor 120 sends data and/or instructions to the components of the machine 100, such as one or more input devices 130 and a video conference application 110. Additionally, the processor 120 receives data and/or instruction from components of the machine 100, such as one or more input devices 130 and the video conference application 110.

The video conference application 110 is an application that utilizes one or more video streams 140 to render and/or re-render a video conference for display on a display device 150. When rendering and/or re-rendering the video conference, the video conference application 110 creates a layout of the video streams 140 for display on the display device 150. Additionally, the video conference application 110 can be utilized in conjunction with one or more input devices 130 to identify a location and a size of a focus region by tracking a head position of a participant viewing the video conference. By identifying a location of the focus region and the size of the focus region, the video conference application 110 can adjust the visibility and display resources devoted to participants of the video conference which the participant is focusing on.

When tracking the head position, the video conference application 110 configures one or more of the input devices 130 to track changes made to the head position of the participant in response to one or more head movements made by the participant. Additionally, the video conference application 110 tracks one or more head movements by configuring one or more of the input devices 130 to track a direction of the head movement made by the participant and an amount of the head movement. In one embodiment, the video conference application 110 additionally considers whether the head movement includes a rotation and a degree of the rotation when identifying the focus region.

Once the video conference application 110 has identified the focus region of the participant, the video conference application 110 renders and/or re-renders the video conference to increase an amount of display resources for one or more of the participants included in the focus region and/or decreases the amount of display resources for one or more of the participants not included in the focus region. In one embodiment, the videoconference application 110 increases and/or decreases display resources for one or more of the participants in response to the focus region by simulating motion parallax between participants of the video conference.

The video conference application 110 can be firmware which is embedded onto the machine 100. In other embodiments, the video conference application 110 is a software application stored on the machine 100 within ROM or on a storage device 180 accessible by the machine 100 or the video conference application 110 is stored on a computer readable medium readable and accessible by the machine 100 from a different location. Additionally, in one embodiment, the storage device 180 is included in the machine 100. In other embodiments, the storage device 180 is not included in the machine, but is accessible to the machine 100 utilizing a network interface 160 included in the machine 100. The network interface 160 may be a wired or wireless network interface card.

In a further embodiment, the video conference application 110 is stored and/or accessed through a server coupled through a local area network or a wide area network. The video conference application 110 communicates with devices and/or components coupled to the machine 100 physically or wirelessly through a communication bus 170 included in or attached to the machine 100. In one embodiment the communication bus 170 is a memory bus. In other embodiments, the communication bus 170 is a data bus.

As noted above, the video conference application 110 renders and/or re-renders the video conference for display on a display device 150. The video conference application 110 utilizes one or more video streams 140 of participants participating in the video conference when rendering and/or re-rendering the video conference. The video conference application 110 can organize and render the video conference such that video streams 140 of the participants are displayed in one or more rows.

In one embodiment, the video streams 140 of the participants are organized for display in the video conference such that the participants are shown to be in a single horizontal row. In other embodiments, the video streams 140 of the participants are organized such that the participants are shown to be in more than one row. One or more rows of the participants can be cascaded. In other embodiments, one or more rows of the participants can overlap one another.

Once the video conference application 110 has organized and positioned the video streams 140 of the participants, the video conference application 110 can render the video conference for display on a display device 150 coupled to the machine 100. The display device 150 is a device that can create and/or project one or more images and/or videos for display as the video conference. In one embodiment, the display device 150 is a monitor and/or television. In other embodiments, the display device 150 is a projector.

Once the video conference application 110 has rendered the video conference, a participant can view the video conference on the display device 150 and the video conference application 110 can identify and/or update a location and a size of a focus region of the participant by tracking a head position of the participant with one or more input devices 130.

A focus region corresponds to a position in the video conference that the participant is looking at or focusing on. As a result, the focus region corresponds to one or more participants of the video conference which the participant is focusing on.

The video conference application 110 can create and display an outline of the focus region for the participant to view on the video conference. Additionally, the video conference application 110 can create a default position, a default shape, and/or a default size for the focus region. In other embodiments, the video conference application 110 renders an initial position, shape, and/or size of the focus region in response to an initial head position and an initial head distance of the participant identified by one or more input devices 130.

Further, the location and the size of the focus region can continue to be identified and/or updated as a head position of the participant changes. A head position of the participant corresponds to where the participant's head is when viewing the video conference. As noted above, when tracking the head position of the participant, the video conference application 110 configures one or more of the input devices 130 to track changes made to the head position in response to one or more head movements.

Additionally, as noted above, when tracking one or more head movements made by the participant, the video conference application 110 tracks a direction of a head movement of the participant, an amount of the head movement, and/or a degree of rotation of the head movement.

As a result, the location and the size of a focus region can be identified and/or updated in response to a direction of a head movement of the participant, an amount of the head movement, and/or a degree of rotation of the head movement.

A head movement includes any motion made by the participant's head. In one embodiment, the head movement includes the participant moving his head following a linear path along one or more axes. In another embodiment, the head movement includes the participant rotating his head around one or more axes. In other embodiments, the head movement includes both linear and rotational movements along one or more axes.

As noted above, in tracking the head movements, one or more input devices 130 can be configured to track a direction of the head movement, an amount of the head movement, and/or a degree of rotation of the head movement. One or more input devices 130 are devices which can capture data and/or information corresponding to one or more head movements and transfer the information and/or data for the video conference application 110 to process.

In one embodiment, one or more input devices 130 can include at least one from the group consisting of one or more cameras, one or more depth cameras, one or more proximity sensors, one or more infra red devices, and one or more stereo devices. In other embodiments, one or more input devices 130 can include or consist of additional devices and/or components configured to detect and identify a direction of a head movement, an amount of the head movement, and/or whether the head movement includes a rotation.

One or more input devices 130 can be coupled and mounted on a display device 150 configured to display the video conference. In another embodiment, one or more input devices 130 can be positioned around the machine 100 or in various positions in an environment where the video conference is being displayed. In other embodiments, one or more of the input devices 130 can be worn as an accessory by the participant.

As noted above, one or more input devices 130 can track a head movement of the participant along an x, y, and/or z axis. Additionally, one or more input devices 130 can identify a distance of the participant from a corresponding input device 130 and/or from the display device 150 in response to a head movement. Further, one or more input devices 130 can be configured to determine whether a head movement includes a rotation. When the head movement is determined to include a rotation, the video conference application 110 can further configure one or more input devices 130 to determine a degree of the rotation of the head movement in order to identify where on the display device 150 the participant is focusing on.

Additionally, when tracking the head movements, one or more input devices 130 can utilize the participant's head or eyes as a reference point while the participant is viewing the video conference. In one embodiment, the video conference application 110 additionally utilizes facial recognition technology and/or facial detection technology when tracking the head movement. The facial recognition technology and/or facial detection technology can be hardware and/or software based.

In one embodiment, the video conference application 110 will initially determine an initial head or eye position and then an ending head or eye position. The initial head or eye position corresponds to a position where the head or eye of the participant is before a head movement is made. Additionally, the ending head or eye position corresponds to a position where the head or eye of the participant is after the head movement is made.

By identifying the initial head or eye position and the ending head or eye position, the video conference application 110 can identify a direction of a head movement, an amount of the head movement, and/or a degree of rotation of the head movement. In other embodiments, the video conference application 110 additionally tracks changes to the participant's head and/or eye positions during the initial head or eye position and the ending head or eye position.

In one embodiment, the video conference application 110 can additionally create a map of coordinates 190 of the participant's head or eye position. The map of coordinates 190 can be a three dimensional binary map or pixel map and include coordinates for each point. As one or more input devices 130 detect a head movement, the video conference application 110 can mark points on the map of coordinates 190 where a head movement was detected.

In one embodiment, the video conference application 110 can identify and mark an initial coordinate on the map of coordinates 190 of where the participant's head or eyes are when stationary, before the head movement. Once the video conference application detects the head movement, the video conference application 110 then identifies and marks an ending coordinate on the map of coordinates 190 of where the participant's head or eyes are when they become stationary again, after the head movement is complete.

The video conference application 110 then compares the initial coordinate, the ending coordinate, and/or any additional coordinates recorded to accurately identify a direction of the head movement, an amount of the head movement, and/or a degree of rotation of the head movement.

Utilizing a direction of the head movement, a distance of the head movement, and/or a degree of rotation of the head movement, the video conference application 110 can track a head position of the participant and any changes made to the head position. As a result, the video conference application 110 can identify and adjust a location of the focus region of the participant accordingly.

Additionally, as noted above, the video conference application 110 can also identify a size of the focus region. The size of the focus region can be identified in response to a distance of the participant from one or more input devices 130 and/or the display device 150.

In one embodiment, if the video conference application determines that the head movement is moving forward along the z-axis, closer to one or more input devices 130 and/or the display device 150, the video conference application 110 will determine that the size of the focus region should be smaller to simulate the participant focusing on a specific position and/or specific participants of the video conference.

In another embodiment, if the video conference application 110 determines that the head movement is moving backward along the z-axis, farther away from one or more input devices 130 and/or the display device 150, the video conference application 110 determine that the size of the focus region should be increased to simulate the participant trying to focus on a broader area and/or more participants.

As a result, one or more input devices 130 can determine a distance of the participant from one or more input devices and/or the display device 150 and identify a size of the focus region by tracking a direction of the head movement and an amount of the head movement.

Once the video conference application 110 has identified a location and a size of the focus region, the video conference application 110 can proceed to identify one or more participants included in the focus region. In identifying one or more participants in the focus region, the video conference application 110 will utilize the location of the focus region and identify which video streams 140 are included within the focus region. The video conference application 110 will then identify participants which correspond to the identified video streams 140.

As noted above, the video conference application 110 will then render or re-render the video conference such that display resources for one or more participants and corresponding video streams 140 of the participants included in the focus region are increased. Additionally, the video conference application 110 can render or re-render the video conference such that display resources for one or more participant and corresponding video streams 140 for the participants not included not included in the focus region are decreased.

As noted above, in one embodiment, the video conference application 110 can render the participants of the video conference in more than one overlapping rows. If the participants of the video conference are rendered in more than one overlapping rows, the video conference application 110 can simulate a motion parallax between the participants when rendering and/or re-rendering the video conference in response to head movement from the participant.

In one embodiment, the video conference application 110 simulates motion parallax between the participants by rendering or re-rendering the video conference such that one or more of the participants appear to overlap one another and/or shift along one or more axis at different rates from one another.

Figure 2:
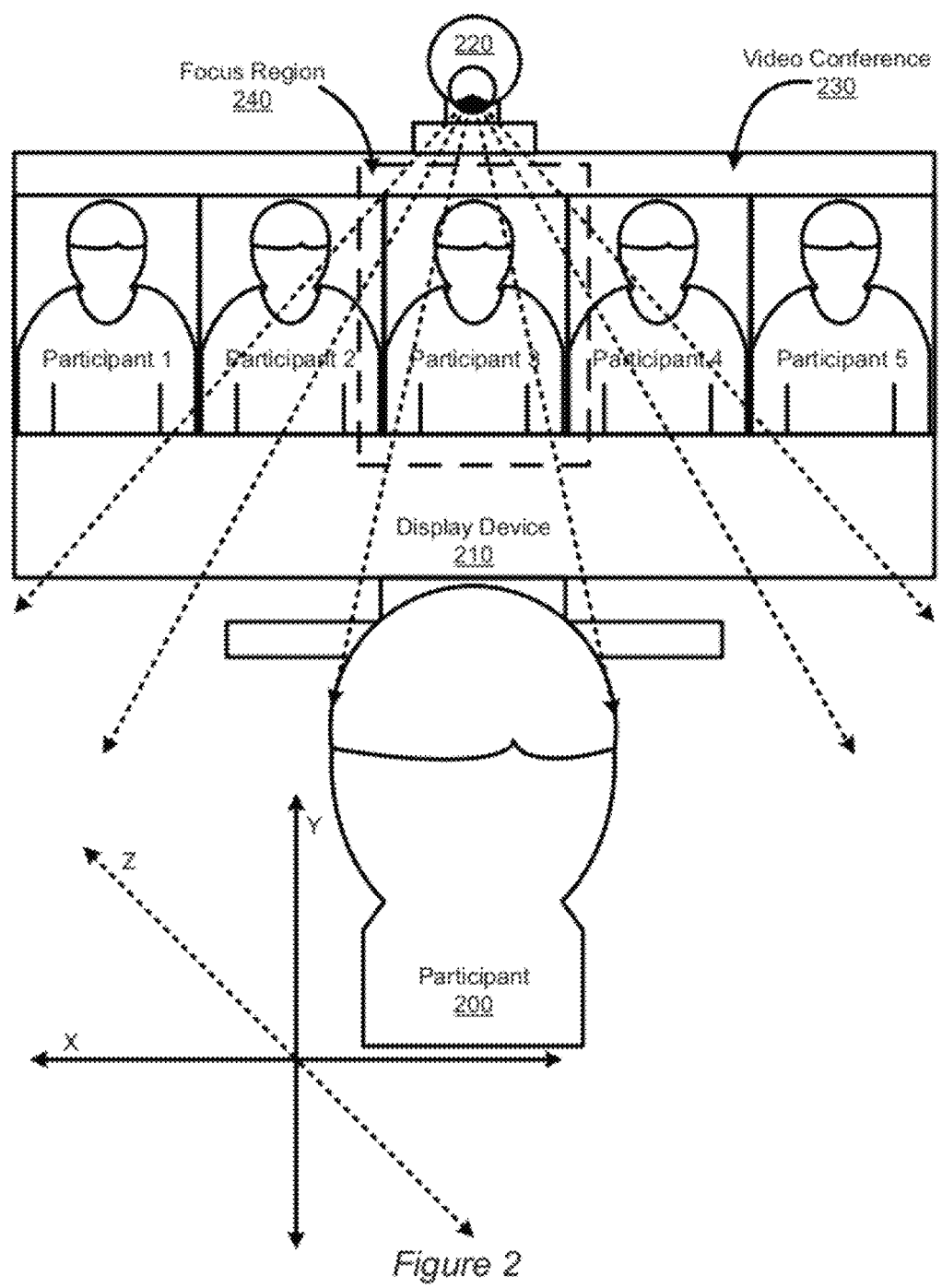
FIG. 2 illustrates an input device configured to track a head position of a participant viewing a video conference according to an embodiment of the invention.

FIG. 2 illustrates an input device 220 configured to track a head position of a participant 200 viewing a video conference 230 according to an embodiment of the invention. As noted above, tracking a head position of the participant 200 includes the input device 220 tracking the head position moving in response to one or more head movements made by the participant 200. Additionally, when tracking one or more head movements, the input device 220 tracks a direction of a head movement of the participant 200 and an amount of the head movement. As noted above, the input device 220 can additionally determine whether the head movement includes a rotation and a degree of the rotation.

As illustrated in FIG. 2, in one embodiment, a default position, a default shape, and a default size is established for the focus region 240. The focus region 240 is given a default position, centered in the middle of the video conference 230. Additionally, the default shape of the focus region 240 is rectangular. Further, the default size of the focus region 240 is at least larger than one of the participants displayed in the video conference 230. In addition, as illustrated in FIG. 2, in one embodiment, an outline of the focus region 240 is displayed on the video conference 230 for the participant 200 to view.

Further, as illustrated in FIG. 2, in one embodiment, one or more input devices 220 are mounted on a display device 210 configured to display the video conference 230. As noted above, one or more input devices 220 are devices which can be configured by the video conference application to detect and track head movements made by the participant 200. In one embodiment, as illustrated in FIG. 2, one or more input devices 220 are cameras which track the head movements of the participant by utilizing the participant's 200 head or eyes as a reference point while the participant 200 is viewing the video conference 230. As noted above, the cameras 220 can be infra red devices and/or depth cameras.

As shown in FIG. 2, the input device 220 can capture a view of the participant's 200 head and/or eyes and use the head and/or eyes as reference points. By capturing the view of the participant's 200 head and eyes, one or more input devices 220 can accurately capture a direction of a head movement, an amount of the head movement, determine whether the head movement includes a rotation, and/or a degree of the rotation.

In one embodiment, as shown in FIG. 2, the participant 200 can make one or more head movements along and/or around one or more axes, such as an x, y, and/or z axes, to move the head position of the participant. As noted above and illustrated in FIG. 2, one or more input devices 220 can track linear and/or rotational head movements individually and/or concurrently.

Further, as noted above, the video conference application can identify and/or update a location and/or size of the focus region 240 in response to the direction of the head movement, the amount of the head movement, and/or a degree of rotation of the head movement. In addition, the video conference application can render and/or re-render the video conference 230 in response to the location and the size of the focus region 240.

Figure 3A:
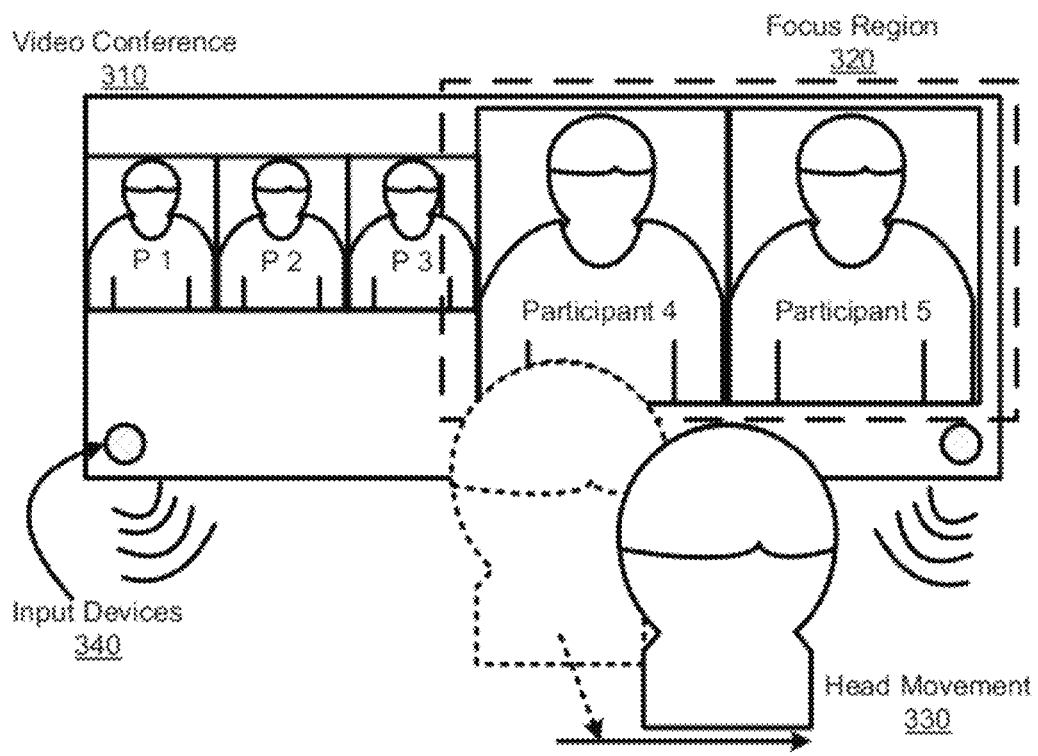
FIG. 3A illustrates a location and a size of a focus region being identified in response to a head position of a participant and a video conference being rendered and/or re-rendered according to an embodiment of the invention.

FIG. 3A illustrates a location and a size of a focus region 320 being identified in response to a head position of a participant 300 and a video conference 310 being rendered and/or re-rendered according to an embodiment of the invention. As noted above, a video conference application can identify a location and/or a size of the focus region 320 in response a head position of the participant 300. Additionally, as noted above, a location and a size of the focus region 320 can be identified and/or change in response to a direction of the head movement 330, an amount of the head movement 330, and/or a degree of rotation of the head movement. Further, the video conference application can render and/or re-render the video conference 310 in response to the focus region 320.

In one embodiment, one or more input devices 340 will send information of the head movement 330 to a video conference application and the video conference application will identify a direction of the head movement 330, an amount of the head movement 330, and/or a degree of rotation of the head movement. In the present embodiment, as illustrated in FIG. 3, the video conference application will determine that the head position of the participant 300 is changing. As shown in FIG. 3, the head movement 330 is linear and following a diagonal direction, originating from the front center and moving to the right and rear.

As illustrated in FIG. 3, in response to the direction of the head movement 330, the amount of the head movement 330, and determining that the head movement 330 does not include a rotation, the video conference application shifts the focus region 320 to the right and increases the size of the focus region 320 to include Participant 4 and Participant 5.

Additionally, as noted above, in one embodiment, the video conference application can decrease an amount of display resources for participants not included in the focus region 320. As illustrated in FIG. 3, the video conference application decreases an amount of display resources for the participants by scaling down video streams of the participants not included in the focus region 320. As a result, the video conference application scales down video streams of Participant 1, Participant 2, and Participant 3.

Additionally, as shown in FIG. 3A, in one embodiment, the video conference application can increase display resources for participants included in the focus region 320 by scaling up video streams of the participants included in the focus region 320. As a result, the video conference application scales up the video streams of Participant 4 and Participant 5.

Figure 3B:
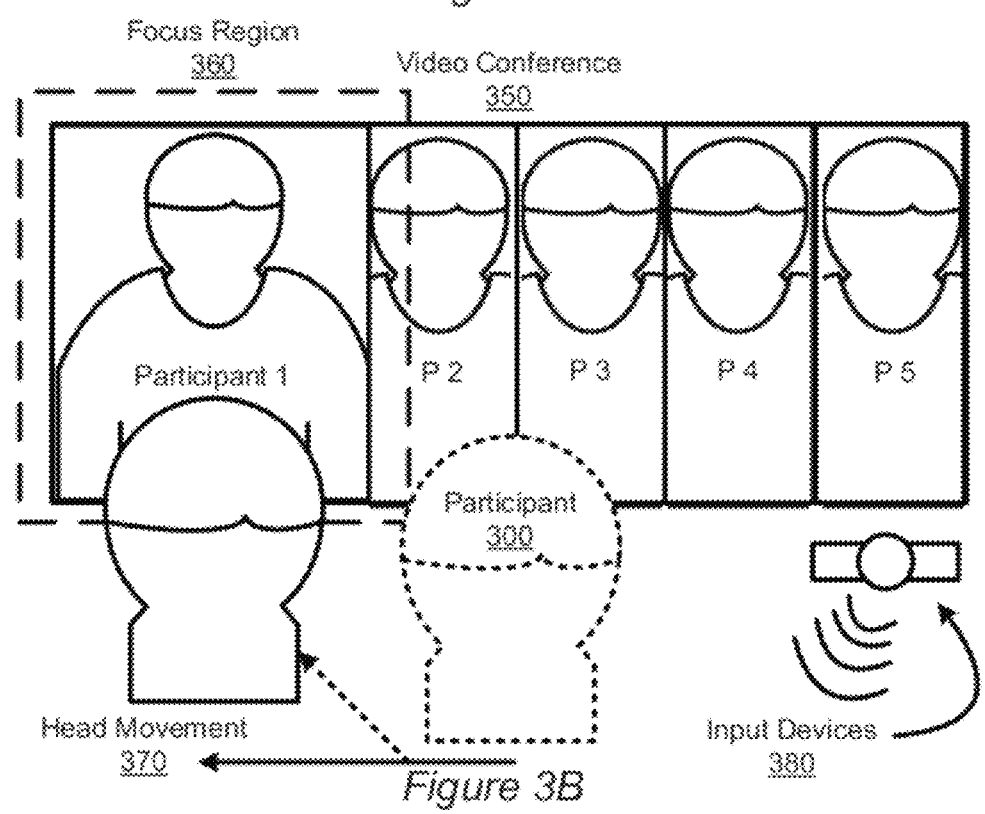
FIG. 3B illustrates a location and a size of a focus region being identified in response to a head position of a participant and a video conference being rendered and/or re-rendered according to another embodiment of the invention.

FIG. 3B illustrates a location and a size of a focus region 360 being identified in response to a head position of a participant 300 and a video conference 350 being rendered and/or re-rendered according to another embodiment of the invention. As illustrated in FIG. 3B, an input device 380 detects a head movement 370 changing a head position of the participant 300. Additionally, as noted above, the input device 380 can identify a direction of the head movement 370, an amount of the head movement 370, and/or a degree of rotation of the head movement 370.

In one embodiment, the video conference application can poll one or more input devices 380 for information of the head movement 370 and determine that the head movement 370 is linear and follows a diagonal direction, originating from the center and moving to the front left. As a result, the video conference application identifies that a location of the focus region 360 should be shifted to the far left and a size of the focus region 360 should be decreased.

As noted above, in one embodiment, the video conference application can decrease an amount of display resources for participants not included in the focus region. As illustrated in FIG. 3B, the video conference application can decrease an amount of display resources by cropping video streams of the participants not included in the focus region 360. As a result, as illustrated in FIG. 3B, the video conference application horizontally crops the video streams of Participant 2, Participant 3, Participant 4, and Participant 5.

In another embodiment, the video conference application can vertically crop the video streams. In other embodiments, the video conference application can vertically and/or horizontally skew one or more video streams of the participants in the video conference which are not included in the focus region 360. The video conference application can skew the video streams along one or more axis.

Additionally, as shown in FIG. 3B, in one embodiment, the video conference application can increase display resources for participants included in the focus region 360 by scaling up video streams of the participants included in the focus region 360. As a result, the video conference application scales up the video stream of Participant 1.

Figure 4:
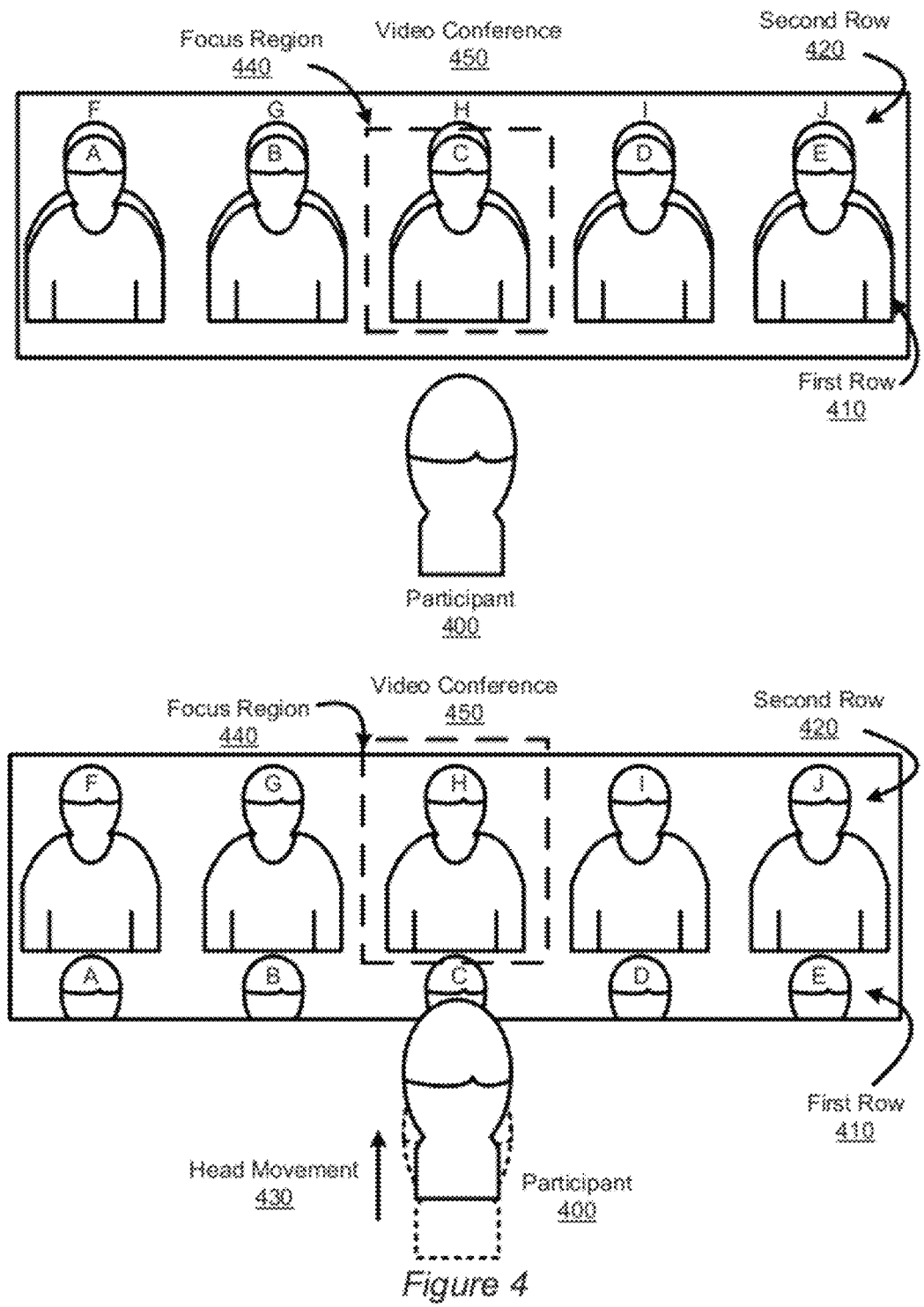
FIG. 4 illustrates a video conference of participants displayed in more than one row and motion parallax between the participants being simulated in response to a head movement of a participant viewing the video conference according to another embodiment of the invention.

FIG. 4 illustrates a video conference 450 of participants displayed in more than one row 410, 420 and motion parallax between the participants being simulated in response to a head movement 430 of a participant 400 viewing the video conference 450 according to another embodiment of the invention. As noted above, a video conference application can configure one or more input devices to track a head position and changes made to the head position. In tracking changes made to the head position, the video conference application tracks a direction, an amount, and/or a degree of a head movement. Utilizing the direction, the amount, and/or the degree of the head movement 430, the video conference application can identify and track a location and a size of a focus region 440.

As shown in FIG. 4, the participant 400 is initially at a center position and a focus region 440 of the participant 400 includes participant C, from the first row 410. Additionally, the video conference 650 is initially rendered such that one or more participants in a second row 420 are mostly obscured by participants from a first row 410.

Figure 6:
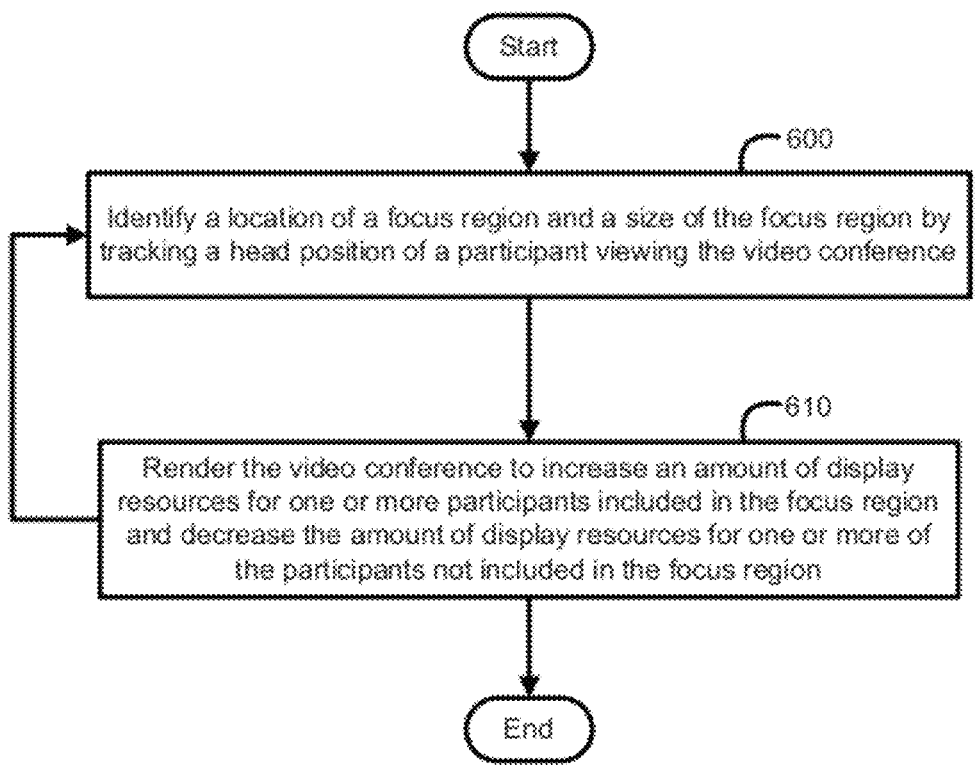
FIG. 6 is a flow chart illustrating a method for rendering a video conference according to an embodiment of the invention.

As illustrated in FIG. 6, in one embodiment, the participant 400 makes a linear head movement 430 along a y axis, shifting up from a center position. As a result, the video conference application detects the head movement 430 and identifies that the focus region 440 should be shifted up and moved from participant C to participant H, in the second row 420.

Additionally, as illustrated in FIG. 4, the video conference application simulates motion parallax between the participants when rendering and/or re-rendering the video conference 450 to simulate the participant 400 looking over the participants in the first row 410. The video conference application shifts up participants in the second row 420 and shifts down participants of the first row 410.

When simulating motion parallax, the video conference application can scale down, crop, and/or vertically skew one or more video streams to simulate one or more of the participants overlapping one another and shifting along one or more axes at different rates from one another. Additionally, more display resources are allocated for participant H, included in the focus region 440, and less display resources are allocated for the participants in the first row 410, outside of the focus region 440.

Figure 5:
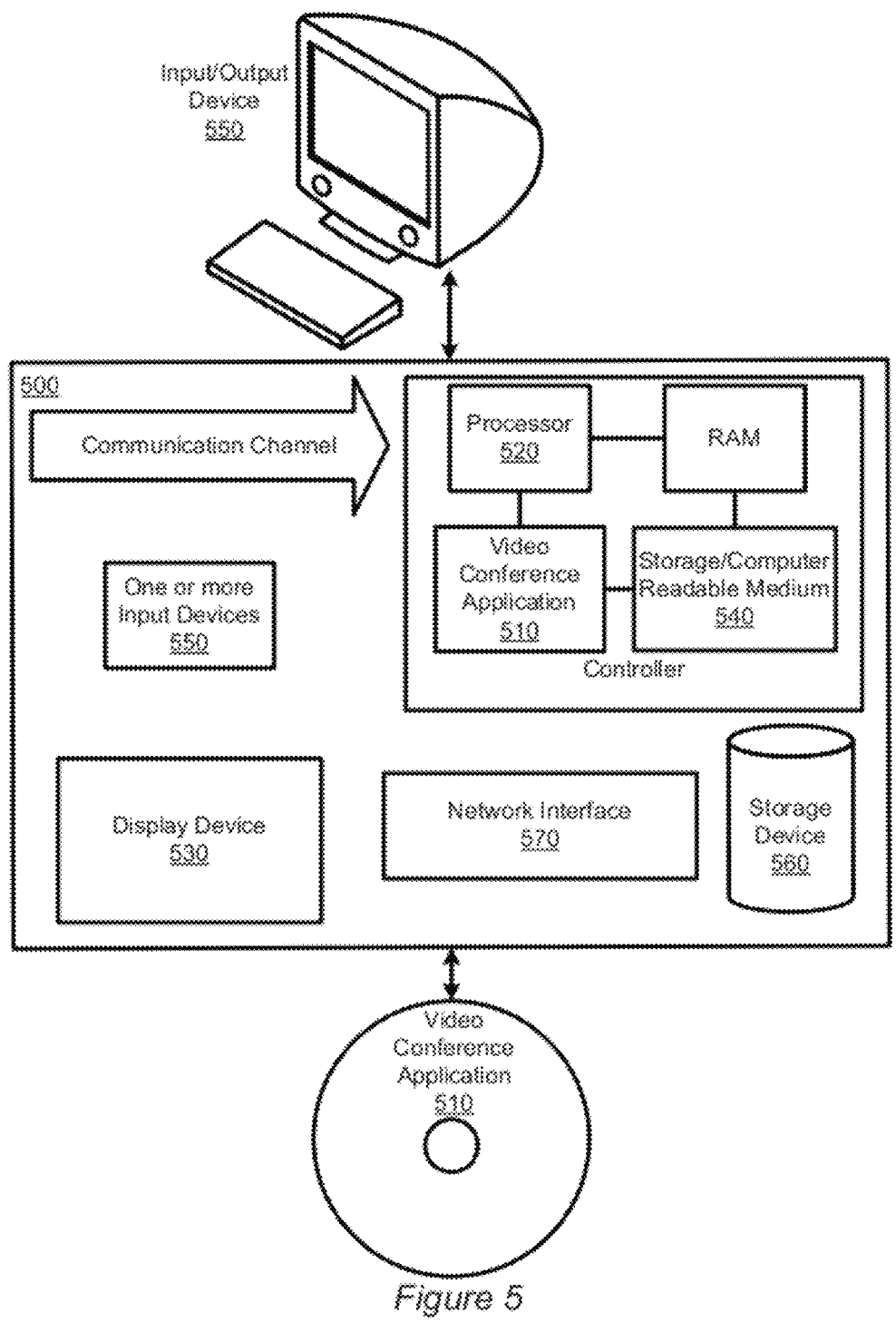
FIG. 5 illustrates a machine with an embedded Video Conference Application and a Video Conference Application stored on a removable medium being accessed by the machine according to an embodiment of the invention.

FIG. 5 illustrates a machine 500 with an embedded Video Conference Application 510 and a Video Conference Application 510 stored on a removable medium being accessed by the machine 500 according to an embodiment of the invention. For the purposes of this description, a removable medium is any tangible apparatus that contains, stores, communicates, or transports the application for use by or in connection with the machine 500. As noted above, in one embodiment, the Video Conference Application 510 is firmware that is embedded into one or more components of the machine 500 as ROM. In other embodiments, the Video Conference Application 510 is a software application which is stored and accessed from a hard drive, a compact disc, a flash disk, a network drive or any other form of computer readable medium that is coupled to the machine 500.

FIG. 6 is a flow chart illustrating a method for rendering a video conference according to an embodiment of the invention. The method of FIG. 6 uses a machine coupled to one or more input devices, a display device, one or more video streams, and a video conference application. In other embodiments, the method of FIG. 6 uses additional components and/or devices in addition to and/or in lieu of those noted above and illustrated in FIGS. 1, 2, 3, 4 and 5.

As noted above, the video conference application initially renders the video conference from one or more video streams of participants. Additionally, as noted above, the participants can be displayed in one or more rows. In one embodiment, the participants are displayed in more than one row, where one or more of the rows overlap one another.

Once the video conference application has rendered the video conference, the video conference application proceeds to utilize one or more input devices to identify a location and a size of the focus region by tracking a head position of a participant viewing a video conference 600. As noted above, the focus region corresponds to a position in the video conference which the participant is looking at or focusing on.

Further, as noted above, in tracking the head position, the video conference application tracks changes made to the head position in response to one or more head movements. Additionally, changes made to the head position can change a location and a size of the focus region.

In one embodiment, when tracking one or more head movements, the video conference application configures one or more input devices to track a direction of a head movement and an amount of the head movement. As a result, a location and a size of the focus region can be determined in response the direction of the head movement and the amount of the head movement. In one embodiment, as noted above, the video conference application can identify and/or update the focus region in further consideration of whether the head movement includes a rotation and a degree of the rotation.

When tracking the head movements, in one embodiment, the video conference application configures one or more input devices to utilize the participant's head or eyes as a reference point while the participant is viewing the video conference. The video conference application will initially determine an initial head or eye position and then an ending head or eye position. Additionally, the video conference application can determine additional head or eye positions between the initial and ending head or eye position.

As noted above, in one embodiment, the video conference application can additionally create a map of coordinates and mark points on the map of coordinates where a head movement was detected. By identifying the initial head or eye position, the ending head or eye position, and/or any additional head or eye positions, the video conference application can identify the direction of the head movement, the amount of the head movement, and/or a degree of rotation of the head movement.

The video conference application can then identify and/or update a location of the focus region to match the direction of the head movement, the amount of the head movement, and/or the degree of rotation of the head movement. Additionally, as noted above, in one embodiment, the size of the focus region can be identified in response to a distance of the participant from one or more input devices and/or the display device.

If the head movement includes moving forward along the z-axis, the video conference application can identify that the size of the focus region should be smaller and adjust accordingly. In another embodiment, if the head movement includes moving backward along the z-axis, the video conference application can identify that the size of the focus region should be larger and adjust accordingly.

Once the video conference has identified the location and the size of the focus region, the video conference application can proceed to render or re-render the video conference to increase an amount of display resources for one or more of the participants included in the focus region and decrease the amount of display resources for one or more of the participants not included in the focus region 620.

In one embodiment, the video conference application can simulate motion parallax between participants when rendering and/or re-rendering the video conference. As noted above, the video conference application simulates motion parallax when the participants are displayed in one or more rows, which overlap one another. When simulating the motion parallax, the video conference application renders the video conference such that one or more of the participants can appear to overlap one another and/or shift along one or more axes at different rates from one another. The video conference can scale down, crop, and/or vertically skew one or more video streams to simulate one or more of the participants overlapping one another and shifting along one or more axes at different rates from one another.

As the participant makes one or more head movements, the video conference application can continue to identify and/or update the location and the size of the focus region by tracking a head position of the participant 600. The video conference application can then render and/or re-render the video conference in response to the head position utilizing any of the methods disclosed above. The method is then complete or the video conference application can continue to repeat the process or any of the steps disclosed in FIG. 6. In other embodiments, the method of FIG. 6 includes additional steps in addition to and/or in lieu of those depicted in FIG. 6.

Figure 7:
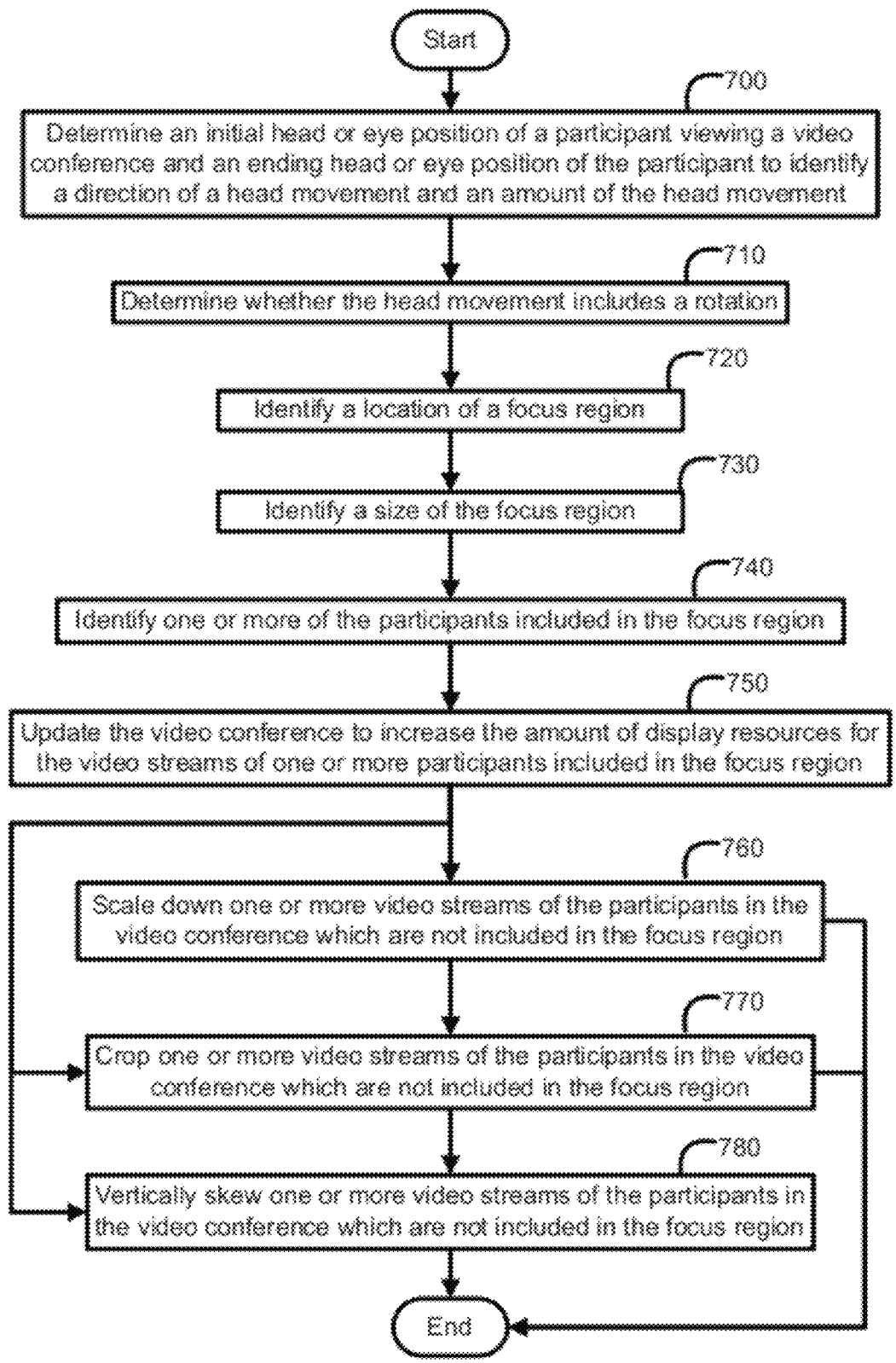
FIG. 7 is a flow chart illustrating a method for rendering a video conference according to another embodiment of the invention.

FIG. 7 is a flow chart illustrating a method for rendering a video conference according to another embodiment of the invention. Similar to the method disclosed in FIG. 6, the method of FIG. 7 uses a machine coupled to one or more input devices, a display device, one or more video streams, and a video conference application. In other embodiments, the method of FIG. 7 uses additional components and/or devices in addition to and/or in lieu of those noted above and illustrated in FIGS. 1, 2, 3, 4 and 5.

As noted above, the video conference application identifies and/or updates a location and a size of a focus region by tracking a head position of a participant viewing the video conference. As noted above, the focus region corresponds to where in the video conference the participant is focusing on. Additionally, the location and the size of the focus region can be identified and/or changed in response to the head position of the participant changing when the participants makes one or more head movements.

When tracking one or more of the head movements, the video conference application determines an initial head or eye position of a participant viewing the video conference and an ending head or eye position of the participant to determine a direction of the head movement and an amount of the head movement 700. In determining the initial head or eye position and the ending head or eye position, the video conference application configures one or more input devices to track the head movement along one or more axis.

Additionally, in one embodiment, the video conference application additionally determines whether the head movement includes a rotation 710. As noted above, if the head movement includes a rotation, the video conference application will additionally determine a degree of the rotation. Utilizing the direction of a head movement, the amount of the head movement, and/or the degree of rotation of the head movement, the video conference application can identify the head position of the participant and changes made to the head position.

The video conference application can then identify and/or adjust a location of the focus region in response to the head position of the participant and/or changes made to the head position 720. Additionally, the video conference application can identify and/or adjust a size of the focus region 730.

As noted above, the size of the focus region corresponds to a distance of the participant from one or more input devices and/or a display device configured to display the video conference. Additionally, as noted above, the distance of the participant from one or more input devices and/or the display device can be determined by one or more input devices tracking a direction of the head movement and an amount of the head movement.

If the head movement includes moving forward along the z-axis, the video conference application can identify that the size of the focus region should be smaller and adjust accordingly. In another embodiment, if the head movement includes moving backward along the z-axis, the video conference application can identify that the size of the focus region should be larger and adjust accordingly.

Once the location and the size of the focus region have been identified and/or adjusted, the video conference application can proceed to identify one or more participants included in the focus region 740. The video conference can then proceed to render and/or re-render the video conference to increase the amount of display resources for the video streams of one or more participants included in the focus region 750.

The video conference application can additionally decrease an amount of display resources for the video streams of one or more participants not included in the focus region.

When decreasing the amount of display resources, the video conference application can scale down one or more video streams of participants in the video conference which are not included in the focus region 760. In another embodiment, the video conference can crop one or more video streams of the participants in the video conference which are not included in the focus region 770. In other embodiments, the video conference application can vertically skew one or more video streams of the participants in the video conference which are not included in the focus region 780. The video conference application can decrease the amount of display resources for video streams of participants not included in the focus region using one or more of the methods disclosed above.

In one embodiment, the video conference application simulates motion parallax between the participants by rendering and/or re-rendering the video conference such that one or more of the participants appear to overlap one another and/or shift along one or more axes at different rates from one another. The video conference can scale down, crop, and/or vertically skew one or more video streams to simulate one or more of the participants overlapping one another and shifting along one or more axes at different rates from one another.

The method is then complete, or the video conference application can continue to repeat the process or any of the steps disclosed in FIG. 7. In other embodiments, the method of FIG. 7 includes additional steps in addition to and/or in lieu of those depicted in FIG. 7.

By utilizing one or more input devices to track one or more head movements of a participant viewing a video conference, a head position of the participant can be tracked. Additionally, by tracking the head position, a location and a size of a focus region of the participant can be identified and/or updated. As a result, time is saved in identifying who the participant is focusing on. Further, by increasing and/or decreasing display resources for one or more participants in response to the focus region, a more user friendly video conference experience is created in allocating display resources to one or more of the participants of the video conference which the participant is focusing on.

What is claimed is:

1. A method for rendering a video conference comprising:
   identifying a location of a focus region and a size of the focus region by tracking a direction of a head movement and an amount of the head movement of a participant viewing the video conference;
   wherein tracking the direction and the amount of the head movement includes determining an initial head or eye position and an ending head or eye position of the participant; and
   rendering the video conference to increase an amount of display resources for one or more participants included in the focus region and decrease the amount of display resources for one or more of the participants not included in the focus region.

2. The method for rendering a video conference of claim 1 wherein the focus region corresponds to one or more of the participants in the video conference which the participant is focusing on.

3. The method for rendering a video conference of claim 2 further comprising identifying one or more of the participants included in the focus region.

4. The method for rendering a video conference of claim 1 further comprising determining whether the head movement includes a rotation.

5. The method for rendering a video conference of claim 1 wherein decreasing the amount of display resources for one or more of the participants not included in the focus region includes scaling down one or more video streams of the participants in the video conference which are not included in the focus region.

6. The method for rendering a video conference of claim 1 wherein decreasing the amount of display resources for one or more of the participants not included in the focus region includes cropping one or more video streams of the participants in the video conference which are not included in the focus region.

7. The method for rendering a video conference of claim 1 wherein decreasing the amount of display resources for one or more of the participants not included in the focus region includes vertically skewing one or more video streams of the participants in the video conference which are not included in the focus region.

8. A machine comprising:
   a processor;
   a display device configured to display a video conference of participants;
   one or more input devices configured to track a head position of a participant viewing the video conference by tracking a direction of a head movement and an amount of the head movement of the participant;
   wherein tracking the direction and the amount of the head movement includes determining an initial head or eye position and an ending head or eye position of the participant; and
   a video conference application executable by the processor from computer readable memory and configured identify a location and a size of a focus region in response to the head position of the participant and render the video conference to increase and decrease display resources for one or more of the participants in response to the focus region.

9. The machine of claim 8 wherein one or more of the input devices track a head position of the participant by tracking a direction of a head movement of the participant and an amount of the head movement.

10. The machine of claim 9 further comprising a map of coordinates which is marked by the video conference application to indicate where the head movement of the participant was detected.

11. The machine of claim 9 wherein one or more of the input devices track the direction of the head movement and the amount of the head movement along one or more axis.

12. The machine of claim 9 wherein the video conference application additionally utilizes facial recognition technology when tracking the direction of the head movement and the amount of the head movement.

13. The machine of claim 11 wherein the size of the focus region is modified in response to one or more of the input devices detecting the head movement along a z-axis.

14. The machine of claim 8 wherein one or more input devices include at least one from the group consisting of one or more cameras, one or more depth cameras, one or more proximity sensors, one or more infra red devices, and one or more stereo devices.

15. A computer-readable program in a non-volatile computer-readable medium comprising:
   a video conference application configured to identify a location of a focus region and a size of the focus region by tracking a head position of a participant viewing a video conference;
   wherein the video conference application is additionally configured to render the video conference to increase an amount of display resources for one or more of the participants included in the focus region by simulating a motion parallax when the participants are displayed in the video conference to be in more than one row and decrease the amount of display resources for one or more of the participants not included in the focus region; and
   wherein the video conference application simulates the motion parallax by rendering the video conference such that one or more of the participants appear to overlap one another.

16. The computer-readable program in a non-volatile computer-readable medium of claim 15 wherein the video conference application simulates the motion parallax by rendering the video conference such that one or more of the participants shift along one or more axes at different rates from one another.

* * * * *